Aug. 14, 1923.

R. SIMPSON

ELECTROLYTE LEVEL INDICATOR

Filed Oct. 24, 1921

1,464,510

Inventor
Ray Simpson.

Patented Aug. 14, 1923.

1,464,510

UNITED STATES PATENT OFFICE.

RAY SIMPSON, OF OAK PARK, ILLINOIS, ASSIGNOR TO JEWELL ELECTRICAL INSTRUMENT COMPANY, OF CHICAGO, ILLINOIS, A CORPORATION OF ILLINOIS.

ELECTROLYTE-LEVEL INDICATOR.

Application filed October 24, 1921. Serial No. 510,124.

*To all whom it may concern:*

Be it known that I, RAY SIMPSON, a citizen of the United States, and resident of Oak Park, in the county of Cook and State of Illinois, have invented a certain new and useful Improvement in Electrolyte-Level Indicators, of which the following is a full, clear, concise, and exact description, reference being had to the accompanying drawings, forming a part of this specification.

My invention relates to means for affording an indication relative to the height of electrolyte in the cells of storage batteries. When employed in connection with an automotive vehicle, my invention enables the driver, by a glance at an indicating instrument located on the instrument board, or at other point visible from the driver's position, to ascertain whether the level of electrolyte in a cell of his battery is below a certain predetermined minimum height.

A salient feature of the present invention is the provision of a certain electrode of novel construction which can be quickly, accurately and economically applied to practically all types of storage batteries now in use.

Figure 1:
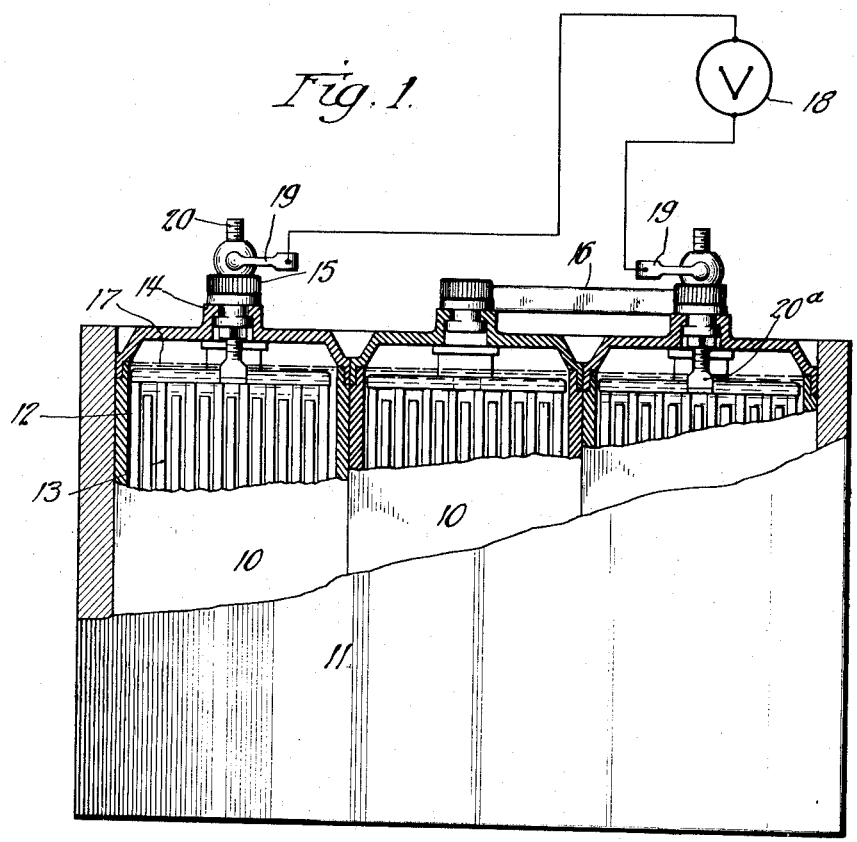
Figure 2:
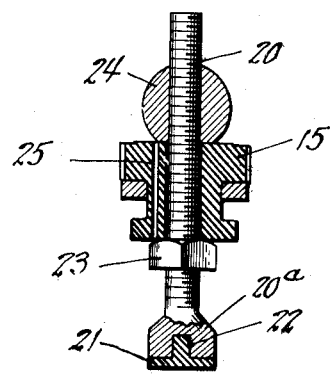

In the accompanying drawings illustrating my invention:

Figure 1 illustrates a three-cell storage battery to which my invention has been applied, certain parts of the battery being illustrated in section more clearly to reveal those parts with which my invention is particularly concerned; and Figure 2 is a view on larger scale of one of the electrodes, this view illustrating how the electrode may be applied to a cap of the type employed for closing the filling openings ordinarily found in the tops of storage battery cells.

Referring first to Figure 1, at 10—10 I have illustrated the jars of three storage cells, these jars being disposed side by side in the usual box or housing 11. The several plates of each cell are illustrated at 12—13. Each cell is provided in the top thereof with the usual filling aperture 14, said aperture in each case being normally closed by a cap. Filling aperture caps are ordinarily threaded in the tops of the cells or retained in position by bayonet connections or the like. The herein illustrated caps, indicated at 15—15, are of the type which, after being inserted into the filling apertures, are secured in position by a quarter turn by virtue of cooperating bayonet joint elements on the cap and cell top. One of the jumpers for electrically connecting a set of plates of one cell with a set of plates of a contiguous cell is illustrated at 16. It will be unnecessary for the purpose of this specification to illustrate the other jumper or the battery terminals. When the battery is in use, each cell should be filled with electrolyte to a level somewhat above the tops of the plates 12—13. The electrolyte is indicated at 17.

The battery, as thus far described, need not differ in any substantial respect from the various types of storage batteries now in use on automotive vehicles for the purposes of ignition, lighting, etc. It may be assumed that the battery illustrated in Figure 1 is connected in the usual manner with the current generating, starting, lighting and ignition devices of the vehicle engine. At 18 I have diagrammatically illustrated an electrical indicating instrument which is adapted to indicate a potential difference between the electrodes presently to be described. The conductors which connect the indicating instrument with the electrodes are preferably provided with spring clip terminals 19—19.

Each of the electrodes comprises a lead stem 20 which is provided at its lower end with a foot 20$^a$. The bottom surface of the foot 20$^a$ is provided with a shoe or sheath 21, which is formed of insulating material, said shoe or sheath being preferably provided with a shank 22 which is threaded or otherwise tightly secured in a central opening in the foot 20$^a$. The shoe or sheath 21 is comparatively thin. Its purpose is to insulate the bottom of the foot 20$^a$ from the plates of the cell with which the electrode is employed. As illustrated in Figure 2, the stem 20 extends freely through a central opening in one of the caps 15, the cap being clamped between a nut 23 and a ball 24, said nut and said ball having threaded engagement with stem 20. At 25 is illustrated an opening in the cap 15 which constitutes a vent of the kind usually found in the caps of storage cells.

In applying my invention to a battery of the kind illustrated in Figure 1, the caps 15—15 are removed from the end cells of the battery. Said caps are then provided with central openings to accommodate the electrode shanks 20—20. If the formation of the central openings eliminates the usual vents, new vents of the kind illustrated at 25 are formed in the caps. The balls 24 are now removed from the electrodes and the nuts 23 thereof are threaded down to points closely adjacent the feet 20. The stems 20 of the electrodes are passed through the central openings in their respective caps 15, which are then inserted in apertures 14. The electrodes drop down until the insulating shoes 21 rest upon the tops of the plates 12—13. The feet 20 therefore extend into the electrolyte when the cells contain electrolyte to the proper level. The shoes 21 prevent the electrodes from engaging the battery plates, but nevertheless permit the lower surfaces of the electrodes to lie very closely to the battery plates. The balls 24 are now threaded upon their respective electrode stems 20 until they engage the caps. The electrodes and caps are then removed from the cells and the nuts 23 are turned up securely to clamp the caps between said nuts and the balls 24. Since the dimensions of storage batteries vary considerably with different manufacturers, the electrode stems 20 will usually be of a length greater than is necessary in connection with most batteries. After the electrodes have been properly adjusted with respect to and secured to the caps 15, the excess of the shanks which projects above the nuts 24—24 may be cut away.

With the battery charged, there is a substantial potential difference between the electrolyte in the two end cells. This potential difference is indicated by the instrument 18 so long as the electrolyte in neither of said cells falls below the electrodes. However, if the level of electrolyte in either of the end cells falls below the electrode associated with that cell, the circuit including the indicating instrument is broken and the pointer of the indicating instrument returns to its de-energized position, thus indicating to the driver that at least one, and probably all, of the cells of his battery should be replenished with electrolyte.

I wish to have it understood that I do not, in any way, limit myself to the use of two electrodes of the type described. For instance, I might use but one electrode in one cell of the battery, connectng one terminal of the indicating device with the electrode, and the other terminal of the indicating device with one of the battery terminals. Other variations in the specific application of my invention will suggest themselves to persons familiar with the general class of devices to which my invention relates.

Having thus described my invention, what I claim is new and desire to secure by Letters Patent of the United States is:

1. The combination with a removable cap for closing an opening in a cell of a storage battery, of an electrode comprisng a metal stem which extends freely through an aperture in said cap, a pair of clamping members threaded upon said stem and adapted to lie above and below said cap, and spacing means of insulating material carried at the lower end of said stem, said spacing means adapted to contact with the plates of the cell into which the stem projects but to prevent the stem from engaging said plates.

2. The combination with a removable cap for closing an opening in a cell of a storage battery, of, an electrode comprising a stem which extends through an opening in said cap, a shoe of insulating material secured to the lower end of said stem, said shoe adapted to rest upon a plate, or plates, of the cell, and to insulate the stem from said plate, or plates, and means for securing said stem at any one of a plurality of adjustments with respect to said cap.

3. The combination with a removable cap for closing an opening in a cell of a storage battery, of an electrode comprising a stem which extends through an opening in said cap, said stem having secured thereto at its lower end a shoe of insulating material adapted to rest upon a battery plate, or plates, and to insulate the stem from said plate or plates.

In witness whereof, I hereunto subscribe my name this 20th day of October, 1921.

RAY SIMPSON.

Witnesses:
JOHN H. MILLER,
ARTHUR J. DAHLGREN.